US006813825B2

(12) United States Patent
Sadiku

(10) Patent No.: US 6,813,825 B2
(45) Date of Patent: Nov. 9, 2004

(54) METHOD FOR PRODUCING A DISTRIBUTED WAVE WINDING

(75) Inventor: Sadik Sadiku, Neuberg (DE)

(73) Assignee: Elmotech Elektro-Motoren-Technik, Karbe (DE)

( * ) Notice: Subject to any disclaimer, the term of this patent is extended or adjusted under 35 U.S.C. 154(b) by 225 days.

(21) Appl. No.: 10/261,601

(22) Filed: Oct. 2, 2002

(65) Prior Publication Data

US 2003/0024104 A1 Feb. 6, 2003

Related U.S. Application Data

(62) Division of application No. 09/508,186, filed on Mar. 8, 2000, now Pat. No. 6,601,286.

(30) Foreign Application Priority Data

Sep. 8, 1997 (DE) .......................................... 197 39 353

(51) Int. Cl.$^7$ ............................................... H01F 7/06
(52) U.S. Cl. .............................. 29/605; 29/596; 29/598; 29/592.1; 29/606; 310/42
(58) Field of Search ............................... 29/592.1, 596, 29/598, 605, 606; 310/42

(56) References Cited

U.S. PATENT DOCUMENTS 3,791,419 A * 2/1974 Arick et al. ................ 140/92.1
4,677,334 A * 6/1987 Finegold et al. ............ 310/268
5,609,187 A * 3/1997 Hachisuka et al. ........ 140/92.2
5,881,778 A * 3/1999 Barrera ...................... 140/92.2

FOREIGN PATENT DOCUMENTS

JP        56049658 A   *  5/1981   .......... H02K/15/04

OTHER PUBLICATIONS

"The design of equalizer windings for lap–wound DC machines"; Pagel, A.; Meyer, A.S.; Landy, C.F.; Industry Applications, IEE Transactions on , vol.: 37 , Issue: 4 , Jul.–Aug. 2001 pp.: 1000–1011.*

* cited by examiner

Primary Examiner—A. Dexter Tugbang
Assistant Examiner—Paul D Kim
(74) Attorney, Agent, or Firm—Stites & Harbison PLLC; Ross F. Hunt, Jr.

(57) ABSTRACT

A method is provided for producing a distributed wave winding. To accelerate the currently used method for producing a distributed wave winding the invention provides for a relative indexing to be carried out between the template and coil receiver after a concentric coil group has been ejected and for a further concentric coil group of the same phase with a connection to previous coil group to be wound on the template and ejected in the coil receiver.

5 Claims, 5 Drawing Sheets

METHOD FOR PRODUCING A DISTRIBUTED WAVE WINDING

RELATIONSHIP TO OTHER APPLICATIONS

This is a division of application Ser. No. 09/508,186 filed on Mar. 8, 2000 now U.S. Pat. No. 6,601,286.

FIELD OF THE INVENTION

The invention relates to a method for producing a distributed wave winding for electric motors or generators, especially those with a high number of poles.

BACKGROUND OF THE INVENTION

In simple undistributed wave windings (see European Patent Disclosure EP 0 226 550 B1, FIG. 1), each phase is a single wave-like coil group, which then when inserted in the stator has the same number of windings in the stator slots as in the stator winding heads. This has the disadvantage that when three phases are placed in the stator, crossings are created that unnecessarily enlarge the winding head, and aside from other disadvantages in particular prevent a high fill factor from being attained. For this reason, a so-called distributed winding is as a rule preferred, in which the wire portions located in a slot of the stator are partly in one circumferential direction and partly in the other on each end face of the stator (see German patent disclosure DE 29 21 114, FIG. 2). Thus the winding heads of one phase are distributed, and together with the other identically disposed phases, they form a relatively narrow winding head.

If the wave winding, for instance according to German Patent Disclosures DE 23 51 952 B2 or DE 31 20 865 A1, is prewound essentially in a round form and then deformed into a star-like or wave-shaped cross section and then inserted, then while double-layered wave windings can still be made, nevertheless the two layers cannot be wound in succession without an interruption in the wire; instead, after the insertion, which results in the situation shown in German Patent DE 35 22 085 C2, they have to be joined together by a so-called circuit interconnection.

Finally, from German Patent DE 42 44 488 C1, it is also already known to create concentric wave-like windings by means of a winding nozzle that revolves relative to a fixed template and to make a distributed winding as described, without any interruption in the wire. However, this is feasible only with the aid of a complicated wire length pulling device, not shown in the reference. This is because when a second coil group begins to be wound, it is necessary for the end of the first coil group that has already been ejected to be held using a wire length pulling device.

In this method, aside from the complicated wire length pulling device required, there is the disadvantage that a revolving winding nozzle winds the coils. As a result, at most two parallel winding wires can be processed. This restriction is due to the fact that the revolving winding nozzle is a flyer with multiple deflections of the winding wire.

Particularly for generators, it is necessary to produce a plurality of parallel windings, that is, more than two such parallel windings; thus the known device runs up against its limits, since even with doubly parallel windings, crossings in the flyer and on the template occur that affect the insertion and the distribution in the winding head.

SUMMARY OF THE INVENTION

It is therefore the object of the invention to create a method of the type defined at the outset and a device suitable for performing the method, which with a short cycle time make it possible to produce a distributed winding with a circuit interconnection between the coil groups and the processing of a plurality of parallel wires.

The above object is attained according to the invention in that after the transfer of a concentric coil group a relative indexing takes place between a template and a coil receiver, and after that a further concentric coil group of the same phase with a connection to the previous coil group is wound onto the template and transferred into the coil receiver.

The invention offers the advantage that the beginning of winding of the second coil group takes place without a complicated wire length pulling device, since the end of the first coil group after the ejection extends obliquely over one flank of a cam of the template, so that when the second coil group begins to be wound, the winding wire is carried along by the template. In certain cases, especially with relatively thin wires, it is necessary for a holding-down device to restrain the already-wound first coil group in the coil receiver and keep it in position, so that when the second coil group begins to be wound, the winding wire will be drawn not from the coil receiver but only from the wire guide nozzle.

Another advantage is that a plurality of parallel wires—at present, four parallel wires—that are required for the stators of generators can be processed without creating crossings between the individual wires, since the individual wires from wire supply barrels are guided directly via a wire guide nozzle onto the template. The invention also makes it possible to process a multiple of the four parallel wires required in the present instance.

The invention is also designed such that one phase can be distributed over more than two coil groups. This can mean that one phase is distributed over six coil groups, for example. In this example, this does lengthen the cycle time, but a better winding head distribution on the stator is achieved. This still changes nothing in the inventive concept that the six coil groups are wound with a circuit interconnection. This is attained in that in the winding of each further coil group, the template and the coil receiver rotate synchronously, and accordingly so do the various wound coil groups that are deposited in the coil receiver. The synchronous rotation is effected by means of a slaving rod that comes from the middle of the template and is coupled into the insertion star and set jointly into rotation by a template drive.

BRIEF DESCRIPTION OF THE DRAWINGS

The invention will be described in further detail below in terms of exemplary embodiments shown in the drawing. Shown are.

DESCRIPTION OF THE PREFERRED EMBODIMENTS

Figure 1:
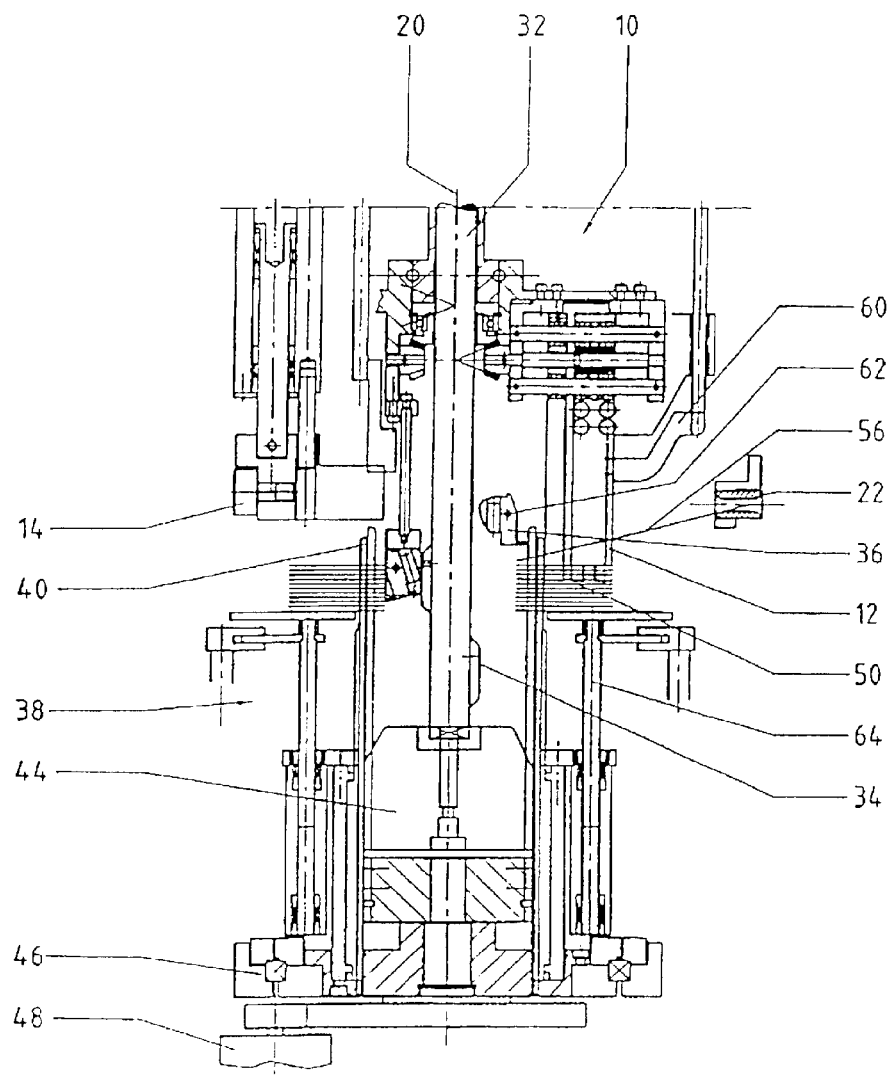
FIG. 1, a winding device for a wave winding, and a coil receiver with a coil group.
Figure 2:
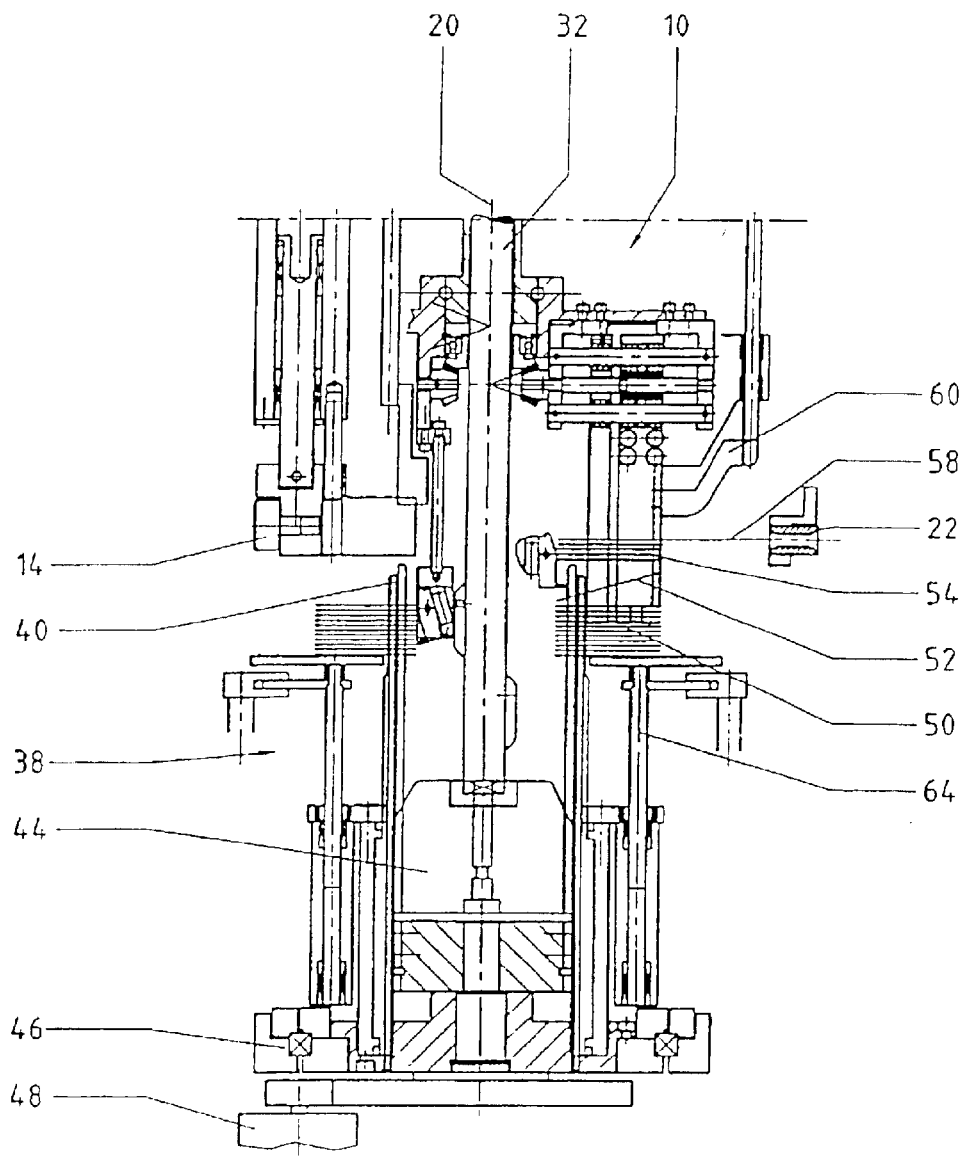
FIG. 2, a device identical to FIG. 1 but with two coil groups.

FIG. 1 and FIG. 2, in a longitudinal section, show one embodiment of the invention, whose winding principle has already been described in detail in German Patent Disclosure DE 0S 43 06 624. The winder 10 comprises a template 12 and forming elements 14, 16 and 18, which are embodied rotatably about a common axis 20 through a motor, not otherwise shown, and a wire guide nozzle 22, which is disposed in stationary fashion. A slaving rod 32 rotatable synchronously with the template 12 is disposed on the axis 20, which is capable of making a positive connection with a coil receiver 38. Secured to the slaving rod 32 is a cam 34, which controls a holding-down device 36.

In this example, the coil receiver 38 comprises individual insertion laminations 40 disposed in a circle, between which slots are formed which receive the fully wound coils. A insertion star 44 is disposed at the center of the insertion laminations 40 and can be coupled to the slaving rod 32. The complete coil receiver 38 is rotatably supported by a bearing 46 relative to a housing, not shown, and can be indexed by a drive motor 48 into a different rotary angle position relative to the template 12. It is also possible for the indexing of the coil receiver 38 to be done via the slaving rod 32.

FIG. 1 shows a first already-wound coil group 50 that has been ejected from the template 12 into the coil receiver and has a circuit interconnection 56 to the wire guide nozzle 22.

FIG. 2 shows the same view as FIG. 1, but with a second coil group 54; the interconnection 52 is automatically integrated between the two coil groups 50 and 54 when the winding of the second coil group 54 begins, without forming an unnecessary length.

Figure 3:
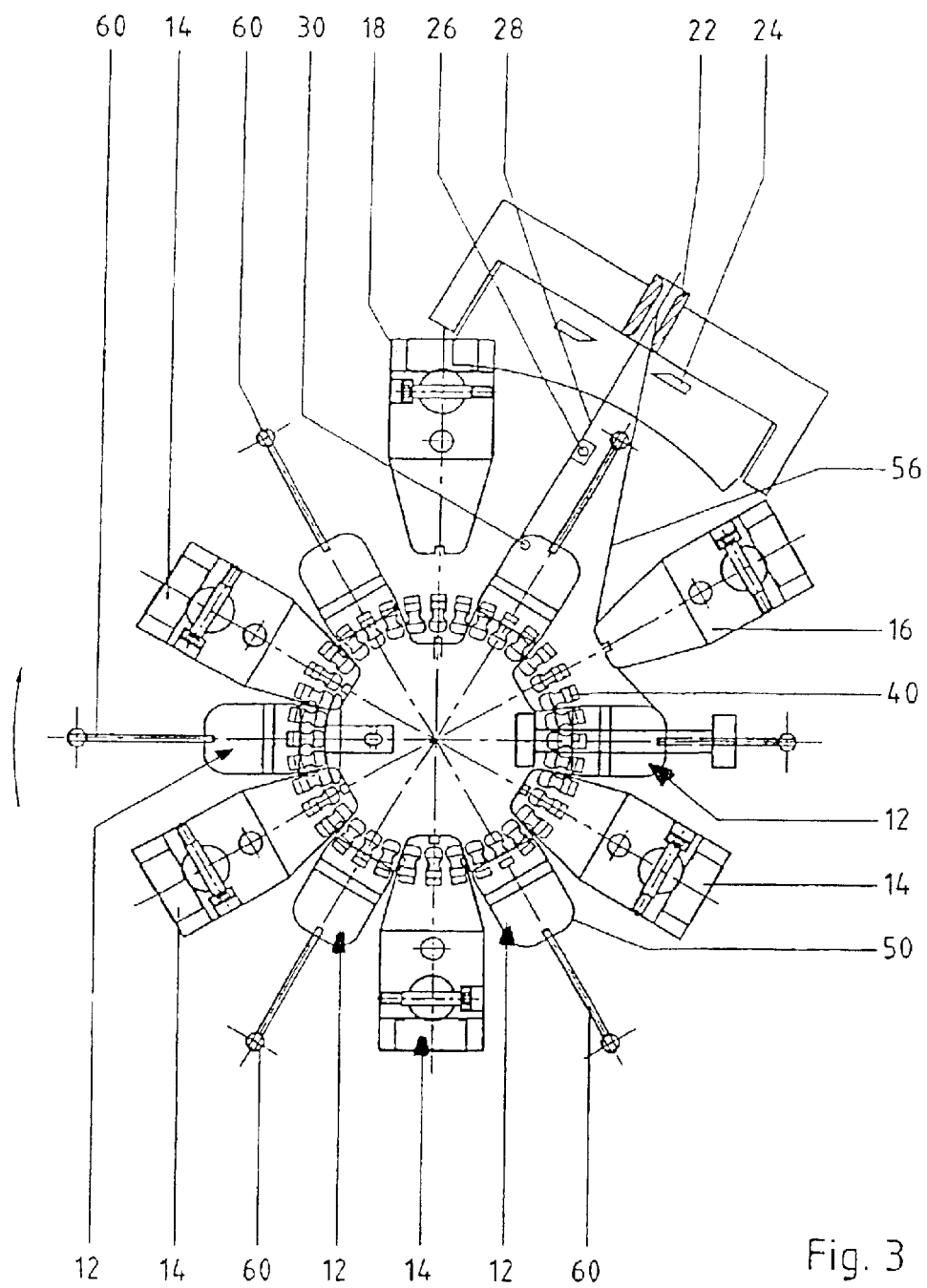
FIG. 3, a cross section through FIG. 1.
Figure 4:
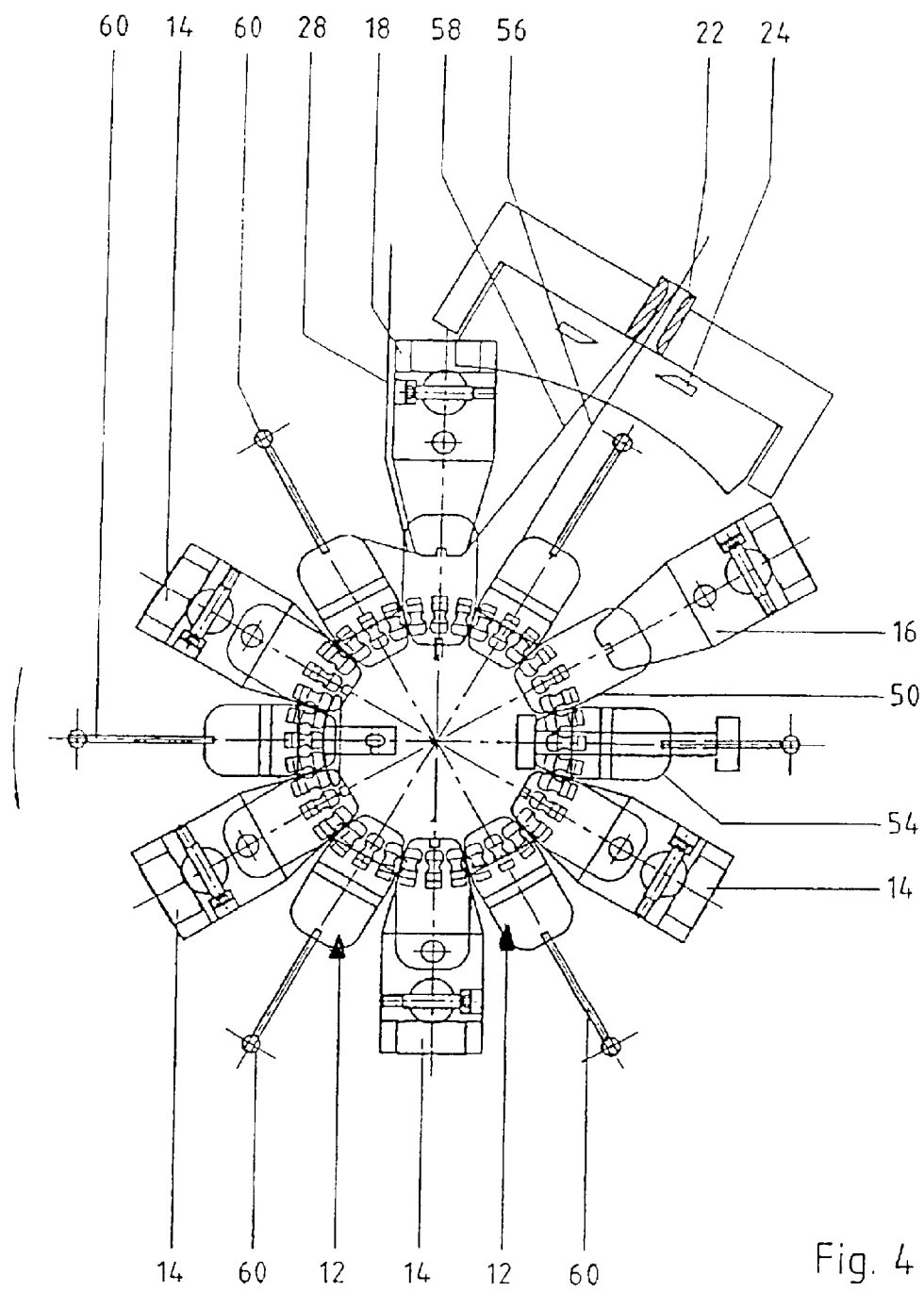
FIG. 4, a cross section through FIG. 2.

FIGS. 3 and 4 show a cross section through FIGS. 1 and 2, respectively, and in detail show that a cutting knife 24 and a wire delivery head 26 are disposed between the wire guide nozzle 22 and the template 12, and this delivery head delivers the beginning 28 of a winding wire to a clamping device 30 on the template 12.

In this example, the template 12 comprises six outward-pointing cams, and the forming elements 14, 16 and 18 comprise six inward-pointing cams. The forming elements 14, 16 and 18 are controlled by a cam path, not shown—as already described in DE-OS 43 06 624. Another factor is that the forming elements 16 and 18 are also radially freely controllable by separate drives, not shown.

FIG. 3 shows the beginning 28 of the winding wire and the end 56 of the first coil group 50.

FIG. 4 shows the end 56 of the first coil group 50, which lies against a template cam and at the same time is the beginning for the second coil group 54, and the end 58 of the second coil group 54.

Figure 5:
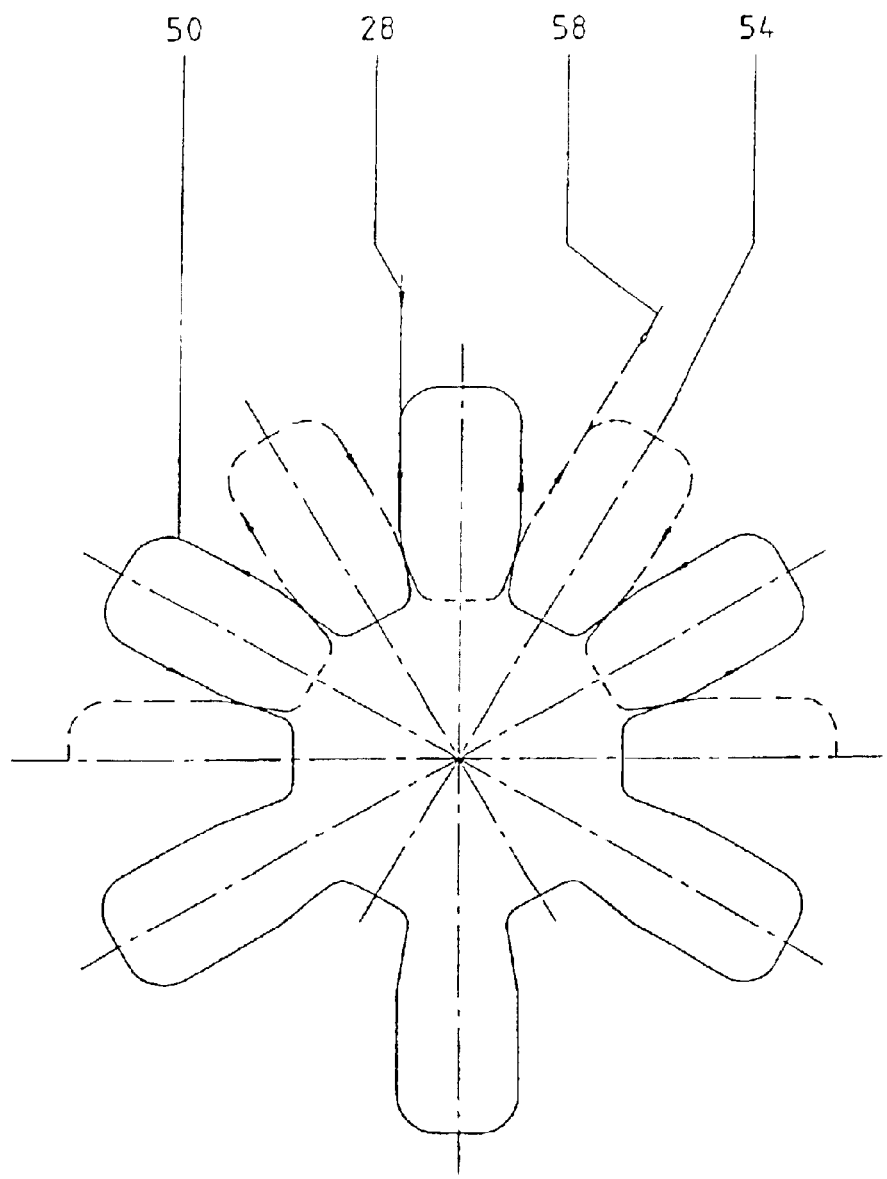
FIG. 5, a pattern diagram of two coil groups.

FIG. 5 shows only the wound pattern diagram of the coil groups 50 and 54; for the sake of clearer explanation, the first coil group 50 is shown complete, while only half of the second coil group 54 is shown.

From FIG. 5, the aforementioned stated object of the invention can be described in greater detail. If as is already known only the first—wave winding—coil group 50 were wound and inserted into a stator, then the winding heads would have the same number of windings as the wires present in a slot.

If the so-called "distributed winding" is wound, however, by dividing the number of windings of one phase in half, and if the first coil group 50 is wound with half of the windings and then with the circuit interconnection the second coil group 54 is wound with the second half of the windings, the result after the insertion of this phase into the slots is the required number of wires, but the windings are distributed half to each of the winding heads. This has the advantage that the winding heads are not so thick as in a single wave winding, and it has an even stronger effect if three phases are inserted into one stator.

The mode of operation of the method and device of the invention can now be described in further detail.

FIG. 3 shows the beginning 28 of the winding wire that leads through the wire guide nozzle 22 to the wire guide head 26. By means of a drive, not shown, the wire guide head 26 moves along with the beginning 28 of the wire and guides it to the template 12 and transfers it to the clamping device 30. Next, the template 12 rotates clockwise together with the forming elements 14, 16 and 18 and winds half of the required windings for one phase onto the first coil group 50. Once the first coil group 50 has been wound, its end 56 initially terminates as shown in FIG. 3. Next, only the forming element 16 moves radially forward to the center into its final position and places the end over the insertion laminations 40. The first coil group 50 has thus been wound, and the template 12 can dip into the coil receiver 38, and the coil group 50 is ejected from the template 12 by means of ejectors 60.

To wind the second coil group 54, the template 12 must move out of the coil receiver 38 as far as the winding position, just above the insertion laminations 40, so that then by means of the drive motor 48 the coil receiver 38 can be indexed relative to the template 12 by the distance between two successive poles.

In this example, it is 30° counterclockwise, so that the end 56 is placed as seen in FIG. 4. This end 56 is now the beginning for the second coil group 54 and now leads obliquely from the coil receiver 38 to the wire guide nozzle 22, as seen in FIG. 1. For the sake of better slaving of the winding wire as the winding is begun, the template 12 can be lowered to above the first coil group 50, into the range of the insertion laminations 40; the forming elements 14, 16 and 18 remain in their position above the insertion laminations 40.

Since this oblique wire guidance also extends over one flank of a cam of the template 12, it is now simple, as the winding of the second coil group 54 begins, for the winding wire to be slaved by the template 12.

Before the winding, however, the slaving rod 32 first moves into the insertion star 44, where it is coupled with positive engagement, so that it rotates the coil receiver 38 synchronously when the template 12 rotates. A synchronous rotation of the coil receiver 38 together with the template 12 can also take place when the first coil group 50 is being wound. Before the second coil group 54 is wound, it is necessary in some cases for a holding-down device 36 to hold the already-wound first coil group 50 back in the coil receiver 38 and keep it in position, so that when the winding of the second coil group 54 begins, the winding wire will not be drawn from the coil receiver 38 but rather only out of the wire guide nozzle 22. The holding-down device 36, which after the winding of the second coil group 54 is located between the first and second coil groups, is tuned away by means of a cam 34 about a pivot point 62 into an inner free space. This moving away of the holding-down device (36) is shown symbolically in FIGS. 1 and 2 on the left-hand side of the center line. A lifting unit 64 is controllable such that the first coil group 50 is held in a desired position below the upper edge of the insertion laminations 40 and holding-down device 36 in such a way that a secure beginning of winding of the second coil group 54 is assured.

As already noted, the end 56, that is, the beginning of the second coil group 54 after the indexing of the coil receiver 38 is located as seen in FIG. 1 and FIG. 4. The template 12 now rotates counterclockwise together with the coil receiver 38, and as a result pulls the winding wire out of the wire guide nozzle 22 and deforms it to form the second waveshaped coil group 54.

After the winding, the end 58 of the second coil group 54 is located in front of the forming element 18, as shown in FIG. 4. The forming element 18 is now moved, by means of a drive not shown, radially toward the center into its end position, so that the end 58 is bent over the insertion laminations 40. Thus the second coil group 54 is now fully wound as well.

Since this second coil group 54 is offset polewise from the first coil group 50 and was wound in the opposite direction, the result once the second coil group 54 has been ejected into the coil receiver 38 is a winding pattern as shown in FIG. 5. As a result, the circuit interconnection 52 has automatically been integrated between the two coil groups 50 and 54 when the winding of the second coil group 54 was begun, without forming unnecessary length. Finally, once the end 58 has been cut with a cutting blade 24, the slaving rod 32 has to move out of the coil receiver 38. The coil receiver 38 can now circulate, for instance by means of a turntable, not shown, out of the winding position, and a new coil receiver can circulate into it. As the center rod 32 moves outward, the cam 34 is slaved at the same time, and as a result the holding-down device 36 is pivoted inward, so that it releases the coil groups.

It is also advantageous that with this device, a plurality of parallel wires can also be wound.

It is understood that innumerable further coil groups can follow, with a circuit interconnection to the previously wound ones. This is merely a matter of how the coil groups are designed in the stator. The more coil groups a phase is divided into, the better the distribution of the winding heads in the stator; but because of the frequent indexing of the template 12 relative to the coil receiver 38, this has a negative effect on the cycle time.

What is claimed is:

1. A method for producing a distributed wave winding for electric motors or generators, said method comprising:

generating a first coil group of one phase in wave form on a template rotatable relative to a fixed wire guide nozzle;

transferring the first coil group from the template into an axially aligned coil receiver;

after the transfer of the first coil group, providing a relative indexing between the template and the coil receiver; and after said relative indexing, winding on the template, and transferring into the coil receiver, at least one further coil group of the same phase in wave form with a wire interconnection to the first coil group, the template and the coil receiver being caused to rotate synchronously in the winding of the at least one further coil group in wave form.

2. The method of claim 1, wherein the at least one further coil group is wound oppositely to the first coil group.

3. The method of claim 1, wherein upon rotation of the template, a plurality of parallel wires is drawn out of a wire guide nozzle.

4. The method of claim 1, wherein a holding-down device is used to restrain the first coil group in the coil receiver until the at least one further coil group has begun to be wound.

5. The method of claim 1, wherein after each winding operation, before the transfer of a coil group from the template to the coil receiver takes place, the wire between the guide nozzle and the template is further formed by moving a forming element radially inwardly.

* * * * *